March 3, 1970   A. M. COOK   3,498,283
ABRASIVE CUTTING TOOL
Filed March 17, 1967

INVENTOR
ARNOLD M. COOK
BY
ATTORNEY

United States Patent Office 3,498,283
Patented Mar. 3, 1970

3,498,283
ABRASIVE CUTTING TOOL
Arnold M. Cook, Holden, Mass., assignor to Norton Company, Worcester, Mass., a corporation of Massachusetts
Filed Mar. 17, 1967, Ser. No. 623,868
Int. Cl. B28d 1/04; B24d 5/06
U.S. Cl. 125—15                                   5 Claims

ABSTRACT OF THE DISCLOSURE

An abrasive cutting tool comprising:
(a) a steel disc having a given thickness, a periphery and a center mounting hole;
(b) periodically spaced indentations in said periphery defining land and intervening slots;
(c) each of said slots having a straight radial leading surface; and
(d) a rectangular bonded diamond segment with a thickness greater than said given thickness mounted on each of said radial leading surfaces in substantial alignment with said center mounting hole and extending to said periphery.

BACKGROUND OF THE INVENTION

The field of the invention is abrasive cutting tools in the form of a circular disc. The present invention is particularly related to abrasive grinding wheel blades having a steel center and a segmental peripheral abrasive rim.

The prior uses, raw materials, standards and methods of making bonded diamond abrasive products are disclosed in Kirk-Othmer, "Encyclopedia of Chemical Technology," 2nd edition, vol. 1, particularly pages 25, 28, 31–33, 37 and 38, and vol. 4, particularly pages 293 and 301.

Both natural and synthetic diamonds are useful in the manufacture of the peripheral bonded diamond segments. Abrasive grinding wheel blades having a steel center and a segmental bonded diamond rim are particularly useful for cutting contraction joints in concrete highways, airport runways and the like, and are also useful in the cutting of masonry structures of various kinds and numerous other hard materials.

The bonded diamond segments of the abrasive blades are available with diamond grits of any size but for masonry cutting, grit sizes in the range of from 16 to 100 are preferred. The grain or grit sizes are not critical and are determined, according to the U.S. Standard Sieve Series. The standard concentrations of the bonded diamond sections are 25, 50, 75 and 100, where 100 concentration corresponds to 25% diamonds by volume, and 50 concentration corresponds to 12.5% diamonds by volume, etc.

The state of the prior art diamond abrasive grinding wheel blades is illustrated by the disclosures of Anderson in U.S. Patent #2,796,706, Christensen, Re. 25,434 and Nielsen, 3,016,661. The conventional tungsten carbide-cobalt, copper-tin and ferrous alloy bonds of the prior art will all be found to be useful in the present invention.

The diamond abrasive grinding wheel blades of the prior art have the following limitations:
(a) the diamond segments are bonded to the periphery of the disc and the centrifugal forces developed by rotation of the disc place the bond between the segment and the disc in direct tension;
(b) when the grinding wheel blade is in use for cutting a workpiece, the bond between the segments and the disc is subjected to shear forces in addition to the tension forces;
(c) the segments are thicker than the steel center and because of this the abrasive by-products such as swarf are concentrated by centrifugal force in a flow pattern across the intersection of the segment and the periphery of the disc which results in an abrading action of the steel disc directly under the segment with a resulting breakdown of the wheel and hazard to safety as a result of segments coming loose and flying off from the wheel;
(d) in order to develop maximum strength between the segment and the disc, the inner surface of the segment must be molded to match the curvature of the periphery of the disc;
(e) the differences in the coefficients of expansion for the segment, the bonding material and the disc produces a further stress in the bond between the segments and the disc; and
(f) segments with different curvatures must be made for each diameter of disc used and spacing between segments selected.

In order to overcome some or all of the difficulties discussed above, segments having special shapes have been proposed which usually produce molding problems associated with the production of the specially shaped segment. Because of the arcuate top and differently shaped bottom surfaces of these segments, it is sometimes very difficult to achieve a uniformly distributed diamond composition in the segment because of the mold construction. Other manufacturing problems are concerned with the difficulties of attaching specially shaped segments to the periphery of the steel center.

Summary of the invention

Having in mind the limitations of the prior art, it is an object of the present invention to provide a diamond abrasive grinding wheel blade having improved performance and wear life and a reduced cost of manufacture.

Another object of the present invention is to provide a diamond abrasive grinding wheel blade with segments mounted in a radial position, whereby centrifugal forces place the bond between the segment and the disc in shear rather than in tension.

Still another object of the present invention is to provide a backing for the segments which places the bond between the segment and the disc in compression during the grinding operation.

A further object of the present invention is to avoid the retention of grinding by-products on the projecting edges of the segments mounted on the disc in order to eliminate the problem of under-cutting.

A particular object of the invention is to provide for standardization of segment sizes facilitating their use on many different grinding wheel disc diameters.

Another particular object of the invention is to provide a segment shape which facilitates optimum pressing conditions and orientation of diamonds in the matrix.

According to the present invention a rotary disc abrading tool is provided having a steel center with slots in the periphery thereof, a straight radial leading edge in each slot and a rectangular bonded diamond segment with a thickness greater than the steel center mounted on each leading edge in radial alignment with the center of the steel disc. The segments are joined by a bond such as silver solder to the radial portion of the slots cut in the discs rather than at the periphery. The segments used are smaller than the segments of the prior art and are spaced close together around the periphery of the disc.

Because the segments are rectangular the ease and accuracy of manufacture are greatly improved and a given size segment may be used for any diameter abrasive blade selected. During hot pressing of the segments, since there are no curved surfaces, it is now possible to hold the segment with the thinnest dimension of the segment exposed to the walls of the mold. This results in an optimum orientation of the diamonds in the matrix and reduces the wear on the mold, the total pressure needed and the cost of molding.

The bonded joint between the segment and the disc is radial to the center of the wheel and is more resistant to centrifugal forces. The centrifugal forces developed by rotation of the present grinding wheel place the bond in shear rather than in tension and the radial bond is better able to resist shear forces. When the abrasive grinding wheel blade is applied to a workpiece, the cutting forces are directed against the segments which in turn are backed up by the projecting or radially disposed land portions of the disc which are situated behind the segment to transmit the driving force to the segment. During the cutting operation, the bond between the segment and the disc is placed in compression which is the optimum construction for resisting the forces which tend to pull the segment free from the driving disc.

The radial arrangement of the segments tends to control the exit flow of the grinding by-products, so that the swarf is carried out of the slot being cut by the sweeping action of the segments and therefore this blade avoids the prior art problems of the undercutting the steel disc.

The cutting action of the abrading blade is improved as a result of this removal of the abrasive by-products and a cooler action of the blade results whereby there can be a wider spacing between the diamond segments permitting deeper cuts to be made.

The straight surfaces of the segment and the straight surfaces of the radial face of the slot facilitate better bonding between the segment and the disc in a manner unknown to prior art attachment of diamond segments to disc peripheries. The effects of the differences in coefficient of the expansion between the segment, bond and disc are reduced due to the radial, straight-line orientation.

The construction of the present invention avoids the above described limitations inherent in the prior art and results in a safer, more efficient abrasive grinding wheel blade which is more easily fabricated at a reduced cost.

Brief description of the drawing

The description of the present invention is facilitated by reference to the annexed figures wherein.

Figure 1:
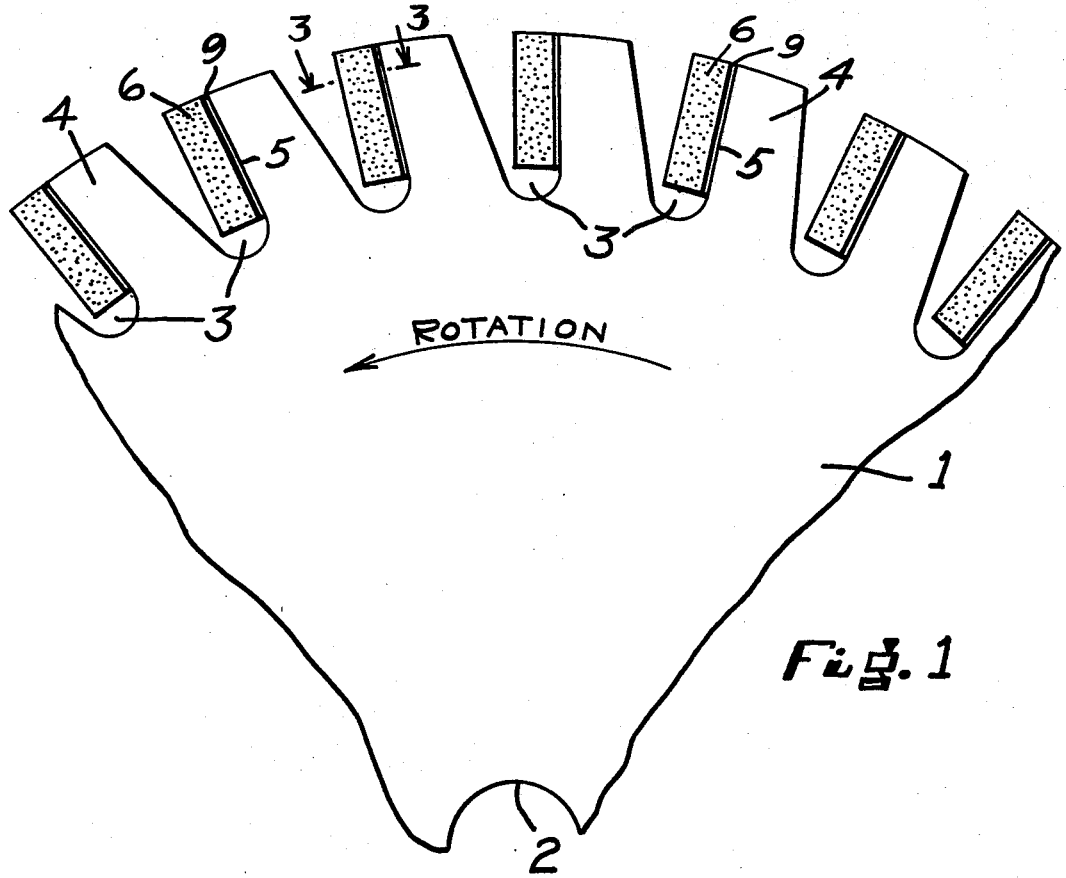
FIGURE 1 is a fragmentary side view of a rotary abrasive cutting tool.

With particular reference to FIGURE 1, a rotary disc abrading tool is shown having a steel center 1, a mounting arbor hole 2, peripheral slots 3 with lands 4 therebetween having radially directed leading edges 5. Diamond segments 6 of conventional composition are adapted to be mounted by a suitable bond 9 on the radial leading edges 5 with their outermost edges tangent to and extending inwardly from the periphery of the disc.

Figure 3:
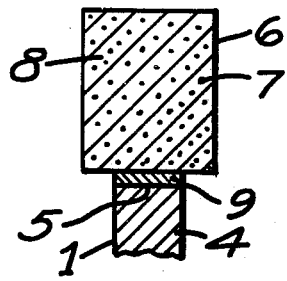
FIGURE 3 is an enlarged section of a diamond segment bonded to the radial face of a peripheral slot, taken on line 3—3 of FIGURE 1.

In FIGURE 3 is shown the segment 6 having diamond grains 7 distributed and bonded by a matrix 8 and a bond 9 for adhering the segment to a radial leading edge 5 of land 4.

Description of the preferred embodiments

A steel center 1 with center hole 2, as shown in FIGURE 1, is selected having a diameter usually in the range of from about 5 inches up to 24 inches or more. The thickness of the steel center selected may vary conventionally from between about 1/16 to 1/8 inch thick. Slots 3 are cut in the periphery of the steel center and lands 4 having the leading straight radial edges 5 are thus provided.

For cutting concrete, a diamond segment having a grit size of 36 and a concentration of 50 is specified. For a given segment size, enough 36 grit diamonds 7 are weighed out to occupy 12.5% of the volume of the molded segment and sufficient tungsten carbide cobalt bond such as disclosed in U.S. Patent 2,796,706 is selected to occupy the remaining volume of the segment and define the bond matrix 8. The volume of the diamonds is preferably between about 6 and 25% and the volume of the matrix is between about 75 and 94%.

The diamond and bond ingredients are mixed by tumbling and then distributed in a rectangular mold having a planar bottom plate. A planar top plate is inserted in the mold cavity and the assembly is simultaneously subjected to the application of heat and pressure to compact the segment. This simultaneous application of heat and pressure is suitably carried out in a hydraulic press wherein induction heating coils are mounted as a source of heat. Each rectangular segment 6 is prepared in the same way regardless of the diameter of the disc to be made, until sufficient segments are available for mounting one in each slot in the periphery of the abrasive plate.

Figure 2:
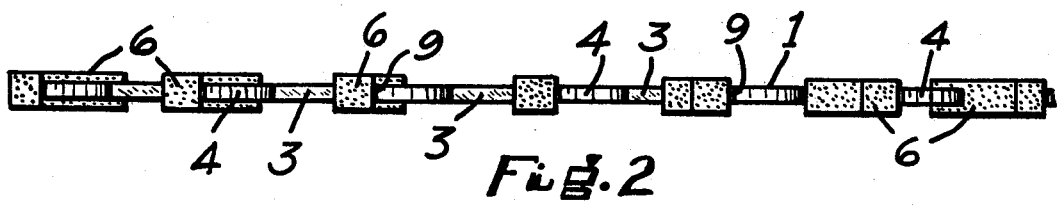
FIGURE 2 is an edge view of the abrasive cutting tool shown in FIGURE 1.

Each of the diamond segments 6 is mounted in a slot 3 on a radial leading edge 5 of a land 4. Each of the segments, which has an axial thickness greater than the axial thickness of the steel center and is mounted on its respective leading edge 5 by bonding it thereto with a material such as silver solder 9. Since the segments have an axial thickness greater than that of the steel center, they are mounted to overlap the steel center equally on each side, as particularly shown in FIGURES 2 and 3 of the drawing.

Any known brazing composition compatible with the disc and segment may be used, but I have found that suitable silver solder compositions useful for adhering the segments of the present invention to the steel discs are as follows:

(a) 25 Ag/52.5 Cu/22.5 Zn
(b) 45 Ag/15 Cu/16 Zn/24 Cd
(c) 54 Ag/40 Cu/5 Zn and
(d) 72 Ag/28 Cu The steel disc with the segments mounted thereon is heat treated, trued and inspected prior to shipment and use.

It will be understood that this invention is susceptible to modification in order to adapt it to different usages and conditions and, accordingly, it is desired to comprehend such modifications within this invention as may fall within the scope of the appended claims.

I claim:

1. An abrasive cutting tool comprising:
   (a) a steel disc having a given axial thickness with parallel side faces, a periphery, and a center mounting hole about a central axis of rotation;
   (b) periodically spaced indentations and radially disposed lands defined thereby in said periphery;
   (c) each of said lands having a single straight flat radial leading surface on the same side thereof; and
   (d) a rectangular bonded diamond abrasive segment of uniform cross section, having an axial thickness greater than that of said disc when mounted thereon, bonded to each of said radial leading surfaces and within said indentations; each of said segments being mounted on said disc to extend substantially an equal amount beyond each side face of said disc and with an outermost edge thereof at the periphery, only one side of said segment and the entire radial length thereof fixed to said land and the opposite side thereof lying substantially on a radial plane passing through central axis;

whereby, in use and throughout the life of the cutting tool, each of the lands and segments begin to wear and cut together at a uniform rate, the bond between each segment and land is placed in shear due to centrifugal force and protected against swarf erosion by the segment, and the entire radial length of each segment is backed up by a land and placed in compression during a cutting operation.

2. The abrasive cutting tool of claim 1, wherein said bonded diamond segments each comprise diamond grains having a volume of about 6 to 25% and a supporting matrix having a volume of about 75 to 94%.

3. The abrasive cutting tool of claim 2, wherein said matrix is selected from the group consisting of tungsten carbide-cobalt, copper-tin and ferrous alloy.

4. The abrasive cutting tool of claim 3, wherein each of said bonded diamond segments is mounted on its respective radial leading surface by a metal bond.

5. The abrasive cutting tool of claim 4, wherein said metal bond is silver solder.

References Cited

UNITED STATES PATENTS

| | | | |
|---|---|---|---|
| 1,156,166 | 10/1915 | Meyers | 125—15 |
| 1,964,972 | 7/1934 | Binns. | |
| 3,127,887 | 4/1964 | Metzger | 51—206 X |
| 3,343,308 | 9/1967 | Fessel | 125—15 X |
| 2,794,458 | 6/1957 | Dosker. | |

FOREIGN PATENTS 403,159 12/1933 Great Britain.

HAROLD D. WHITEHEAD, Primary Examiner

U.S. Cl. X.R.

51—206